Patented Feb. 14, 1950

2,497,583

UNITED STATES PATENT OFFICE 2,497,583

PREPARATION OF MAGNESIUM NITRIDE

Alva C. Byrns, Los Altos, Calif., assignor to The Permanente Metals Corporation, Oakland, Calif., a corporation of Delaware No Drawing. Application February 12, 1945, Serial No. 577,586

7 Claims. (Cl. 23—191)

This invention relates to the formation of magnesium nitride, and particularly to its formation by reaction of a nitrogen-yielding gas with extremely finely divided solid magnesium metal.

A number of methods for preparing magnesium nitride have been reported in the literature but extensive practical preparation of the product has not been known, although magnesium nitride is useful in many chemical reactions, for example, as a dehydrating agent. It is also useful in the compounding of rubber, especially certain synthetic rubbers, probably because it yields ammonia in the presence of water. The methods of preparation reported by various investigators have included heating finely divided metal in a stream of nitrogen, in a restricted amount of air (thereby forming the oxide until available oxygen has been used up, and then forming nitride), decomposition of magnesium ferrocyanide with heat, reaction of the finely divided metal with ammonia, and reduction of KCN or KCNS by magnesium. It has been found that certain disadvantages attend each of these methods. For instances, when the finely divided metal heretofore available has been reacted by passing nitrogen or ammonia gas thereover at temperatures of from 670° C. to 900° C., as has been described in the literature, it is found that a refractory mixture or solution of the nitride in the metallic magnesium is obtained which is a hard, dense, black mass. Contamination with appreciable amounts of magnesium metal is highly undesirable in many applications of this product.

It has also been proposed to react magnesium with nitrogen or ammonia at relatively lower temperatures, that is, from about 400° C. to about 600° C., but this has proved too slow to be practicable in operating with the magnesium powders or turnings available in the prior art. In this reaction, which takes place between a gas and a solid, the direct nitriding of relatively large crystals or masses of the metal does not proceed to completion, perhaps because the magnesium nitride forms a hard coating over the surface of the metal, effectively protecting the inner portions from attack by the nitriding gas.

According to the present invention, magnesium nitride or a magnesium nitride-containing composition is produced by treating with a nitrogen-yielding gas finely divided magnseium obtained by converting magnesium from the vapor state to the solid state by shock-chilling with an inert gas. A convenient source of starting material is carbothermic dust. By the term "carbothermic dust" is meant the solid condensate recovered in the carbothermic process for making magnesium as more fully described hereinafter. In the carbothermic process, magnesium oxide and carbon are reacted in an electric arc furnace at rather high temperatures to produce magnesium vapor and carbon monoxide gas. The vaporous products of reaction issuing from the reduction zone are shock-chilled, usually by means of an inert gas such as hydrogen, hydrocarbon or the like, giving a solid condensate or dust comprising as a major constituent magnesium particles having an extremely small particle size and a correspondingly increased surface. The condensate also contains some admixed magnesium oxide and carbon, some of which has been carried over unreacted from the reaction zone and some of which is developed by the back-reaction of magnesium vapor with carbon monoxide during the condensing step. The condensate or dust can be used as formed or can be suitably pressed into pellets or other shapes for greater ease of manipulation. This operation should be carried out in an inert atmosphere, and the pellets thus formed are less reactive and they can be more easily handled. The pellets can advantageously be crushed prior to nitriding.

The finely divided magnesium may also be obtained by vaporizing magnesium metal in a vaporizing zone, shock-chilling the magnesium vapors as they issue from that zone by means of a suitable chilling gas, and recovering the solid condensate. However, where a very pure nitride is not desired, there are advantages in forming the nitride of the carbothermic dust. For example, the growth of the magnesium crystal size is inhibited by the presence of magnesium oxide and carbon. Furthermore, the carbothermic dust is easily formed into pellets or other agglomerate shapes prior to the nitriding reaction.

The finely divided magnesium obtained as described above is reacted with a nitrogen-yielding gas, such as nitrogen or ammonia, for example. Preferably, the finely divided magnesium is initially reacted with the nitrogen-yielding gas at a temperature below the melting point of the magnesium. Preferably, the temperature of this reaction may range from a starting temperature of about 350° C. where carbothermic dust is the starting material, or somewhat lower if the starting material is pure magnesium metal prepared as described, to a temperature which at the end of the reaction may rise to 900° C. or even higher.

One advantageous method of carrying out this process is to react the shock-chilled magnesium dust, or the carbothermic dust, with a nitrogen-yielding gas at an initial reaction temperature below the melting point of magnesium, e. g. at about 300° C. to about 400° C., until the reaction slows somewhat and then to increase the temperature until reaction has gone to completion, such increased temperature being as high as about 900° C., for example, although the temperature of reaction can of course be increased still further. However, it has sometimes been observed that when crushed pellets of carbothermic dust are nitrided with immediate rapid increase of temperature up to, for example, temperatures above the melting point of the metal, some yellow powder appears on the outside of the pellet material. This is in contrast to the rather uniformly black appearance of such material which has been nitrided as completely as possible at the preferred lower temperatures of reaction, and especially at temperatures below the melting point of magnesium, and this occurrence appears to indicate that under conditions wherein less than a major portion of the magnesium is reacted at the preferred lower temperatures, the vapor pressure of the magnesium is such that some of the metal vaporizes out of the inner portions of the material, or agglomerates and then vaporizes out, and reacts at the surface of the crushed piece, forming a deposit of nitride thereon. (This deposit is yellow in color, not being obscured by the carbon of the carbothermic dust.) It is desired to direct the reaction to the conversion of the original solid metal particles in the dust and it is advantageous to carry out the reaction at temperatures below the melting point of magnesium, or, at any rate, increasing toward the end of the reaction to not over about 900° C. Preferably the reaction is carried out at an initial temperature of about 350° C. and when reaction appears to have ceased or to have slowed considerably, the temperature can then, if desired to hasten the completion of the reaction, be increased to not over 900° C. to cause more complete nitridation.

It is sometimes advantageous in carrying out this process and especially when working with pure magnesium dust, to dilute the nitrogen or ammonia reactant gas with an inert gas, such as hydrogen, the noble gases including helium, argon, or the like, or mixtures of such inert gases. Such dilution prevents an excessive rise in temperature resulting from the heat of reaction.

It is a characteristic of the process and product of this invention that the starting material is magnesium in such extremely finely divided form, if desired diluted with inert materials, such as magnesium oxide, carbon and the like, that the magnesium is pyrophoric or, in other words, it burns spontaneously upon exposure to air or other oxidizing medium. It is the treatment of such finely divided material with a nitrogen-yielding gas which now makes possible the obtaining of magnesium nitride in desired yield and purity. The pyrophoric material is protected from violent oxidation by forming into pellets or the like, or by holding in an inert atmosphere, as in hydrogen, nitrogen at low temperatures or the like. The magnesium starting material is predominantly below one micron in size and the magnesium nitride so produced is also predominantly sub-micron in size.

When finely divided magnesium metal, either in the pure form or as carbothermic dust, is heated the fine particles are found to increase markedly in size. This phenomenon becomes rapid at the melting point of the metal, but also takes place at temperatures considerably below this point. It is particularly important where extremely small particles are involved due to the greater vapor pressure of such particles. The rate of transformation and consequent increase in particle size at temperatures below the melting point is believed due to some type of surface activity involving transfer of solid particles. This is equivalent to sublimation and the rate at which such particles are transferred, i. e. the rate of growth of large particles, is some function of the vapor pressure. At 450° C. the vapor pressure of magnesium is about 0.01 mm. but at the melting point, 651° C., it is 1.82 mm. or over 180 times that at 450° C., and at 900° C. it is over 90 mm. In the process of this invention, therefore, a low initial temperature of reaction evidently prevents increase in the particle size of the magnesium metal. However, as particles of metal are converted to magnesium nitride it is believed that unreacted particles tend to be farther removed and separated from each other by the intervening nitride which then inhibits the increase in particle size of the remaining metal. Under these circumstances, the temperature can be increased, after an appreciable proportion of nitride has been formed, to further the completion of the reaction.

As an example of the method of carrying out this process a cylindrical steel vessel holding about 4 lbs. of starting material is filled with pellets of the carbothermic dust described above and containing 47.5% finely divided magnesium metal. The exterior of the reaction vessel is heated to about 350° C. to 400° C. and there is introduced at the bottom of the cylinder a small flow of mixed hydrogen and nitrogen. The temperature of the pellet bed increases slowly at first but the increase becomes more rapid as reaction begins. The interior temperature, i. e. of the reaction bed, is held at about 500° C. by maintaining only sufficient flow of nitrogen gas therethrough as to attain and keep this temperature, and only enough hydrogen is introduced to maintain a small flame at an outlet aperture in the top cover of the cylinder through which exhaust gases pass. The temperature of the walls of the cylinder is held at about 400° C. to 500° C. during the reaction. This is desirable because, since the vapor pressure of solid magnesium is appreciable at the temperature of the reaction, the presentation of a colder surface as of the cylinder wall, would favor deposition thereon of an amount of massive particles or crystals of magnesium which would no longer be of a size to be available for reaction under the conditions of operation, and would therefore reduce the yield. After the initial partial reaction has passed through the whole reaction bed more nitrogen gas is passed through to raise the temperature to 900° C. The nitrided dust obtained is black in color and retains the form of the original pellets although it may be easily ground. The dust analyzes 18.7% nitrogen as ammonia, corresponding to 55.55% magnesium nitride. The conversion of magnesium to the nitride, therefore is very high and approaches the theoretical. The remainder of the dust is principally MgO and carbon, with traces of other compounds.

The magnesium particles produced by shock-chilling are, by microscopic observation, estimated to be from about 0.1 to about 0.5 micron in diameter, with very few particles larger than 1 micron. The magnesium nitride produced there-from has correspondingly small particle size and is highly reactive. It should be kept in a closed container as it is converted to the hydroxide rather quickly upon exposure to the atmosphere. This product is useful in the compounding of synthetic rubber as described more fully in the co-pending application of Byrns and Von Stroh, Serial Number 574,758, filed January 26, 1945, now Patent No. 2,459,916. For such use, the material, for example, nitrided dust which has been treated to break down agglomerates and restore it to its original particle size, as, for instance, by grinding and air separating, can be protected during storage by admixture with a liquid or liquefied plasticizer for synthetic rubber, inert to the nitride, for example, paraffin, asphalt, hydrocarbon waxes, synthetic resins, esters such as dibutyl phthalate, or the like.

In another example, ammonia gas is passed over crushed pellets of carbothermic dust containing 47.5% magnesium in a small steel tube heated in a furnace. The temperature is slowly increased to 296° C. and at this point the exit gases appear to change and to burn like hydrogen, indicating reaction with ammonia. The temperature is now slowly raised to 350° C. and then cooled, with a total time above 300° C. of about 4 hours. The product is black in color and analyzes 20.1% nitrogen as $NH_3$, corresponding to 59.8% magnesium nitride.

In another variation, magnesium pellets can be fed down through a tower while nitrogen or ammonia, together with an inert diluent gas if desired, is passed upwardly through the tower countercurrent to the pellets to react therewith. A thermostatic system envelopes the outside wall in reaction zone of the tower to maintain the temperature thereof within the desired range. Reacted pellets are drawn off at the bottom. The gas is recycled and thus only a small amount of diluent is added as make-up continuously or from time to time. Suitably hydrogen is the diluent gas when ammonia is used, as hydrogen is one of the products of reaction, and in this case some hydrogen is bled off, continuously or intermittently.

When nitrogen, such as the usual commercial nitrogen, containing the noble gases, argon, helium and the like, is used as the reacting gas, the proportion of noble gases in the gas mixture increases as the gases are recycled and nitrogen is removed by reaction with the metal. Thus, by starting with such nitrogen and a small amount of hydrogen diluent, the noble gas content builds up, especially where the make-up gas for the circuit is not more than about 1% of the nitrogen, and eventually the noble gas containing mixture can be bled off. The withdrawn gases may, if desired, be further processed to recover the constituents or preferred mixtures thereof.

Alternatively, dust can also be treated by allowing it to trickle downwardly through a nitrogen-yielding gas-filled tower, or be conveyed in a heated screw-conveyor through a nitrogen-yielding gas atmosphere.

Alternatively also, pellets or carbothermic dust are placed in a cylindrical retort similar to those used in the sublimation of Mg from carbothermic dust and are held therein in an annular space formed by a removable liner positioned axially of the retort, the space being bounded by the inner wall of the retort and the outer wall of the liner, the liner being gas-pervious, as by being perforated or having apertures therein, adapted to bring the gas into contact with the pellet material. The retort and liner enable the formation, therefore, of a thin vertical layer of pellets into contact with which the gas is conducted. The retort, suitably sealed off from the atmosphere, is filled with a mixture of hydrogen and nitrogen and is heated slowly to about 350° C. to 400° C. The reaction starts and some nitrogen is absorbed. As the pressure drops, the reaction is slowed. This is advantageous in that the reaction is distributed over a large surface of material and excessive local rises in temperature are avoided. More nitrogen is slowly introduced into the central space enclosed by the liner and the temperature rises slowly and uniformly to about 500° C. The reaction proceeds while continuing to introduce nitrogen at such a rate that the temperature at the hottest portion is 500° C. to 600° C. and at the coldest, 400° C. to 500° C. When the reaction slows appreciably, as indicated by lowered rate of absorption of nitrogen and a tendency to decrease in temperature, the temperature is slowly raised, by external heating, to about 700° C., with careful addition of nitrogen to avoid sudden rapid reaction at the melting point of magnesium, 651° C. The temperature is then increased to about 900° C. with a free flow of nitrogen into the reaction zone.

If desired, when the reaction has gone to completion the reaction vessel is evacuated and any residual unreacted magnesium metal removed by distilling it off from the nitrided mass.

The nitrided dust resulting from any of the above processes may be air separated in a dry atmosphere by known means to remove coarse particles of unreacted magnesium oxide and carbon or of metallurgical coke, etc.

What is claimed is:

1. Process for the production of magnesium nitride which comprises reacting solid pyrophoric magnesium in the presence of hydrogen with nitrogen gas at an initial temperature of from about 300° C to about 400° C., and then increasing the temperature to about 900° C. to complete the reaction, said pyrophoric magnesium having been obtained by converting magnesium from the vapor phase to the solid phase by shock chilling with an inert gas.

2. Process for the production of magnesium nitride which comprises forming carbothermic dust into shapes, treating said shapes with nitrogen at an initial temperature of from about 350° C. to about 400° C., and then increasing the temperature to about 900° C. to complete the reaction.

3. Process for the production of magnesium nitride which comprises reacting solid pyrophoric magnesium, obtained by converting magnesium from the vapor phase to the solid phase by shock chilling with an inert gas, with ammonia, in the presence of hydrogen gas, at a temperature of from about 296° C. to about 350° C.

4. Process for the production of magnesium nitride which comprises reacting solid pyrophoric magnesium with a nitrogen-yielding gas diluted with an inert gas, said reaction being effected at an initial temperature from about 296° C. to below the melting point of magnesium, and then increasing the temperature to about 900° C. to complete said reaction, said pyrophoric magnesium being obtained by converting magnesium from the vapor state to the solid state by shock chilling with an inert gas.

5. Process for the production of magnesium nitride which comprises reacting solid carbothermic magnesium dust with a nitrogen-yielding gas at an initial temperature of from about 296° C. to below the melting point of magnesium, and then increasing the temperature to about 900° C. to complete the reaction.

6. Process as in claim 5 wherein the gas is nitrogen.

7. Process as in claim 5 wherein the gas is ammonia.

ALVA C. BYRNS.

REFERENCES CITED

The following references are of record in the file of this patent:

UNITED STATES PATENTS

| Number | Name | Date |
|---|---|---|
| 1,803,720 | Miner | May 5, 1931 |
| 2,025,740 | Hansgirg | Dec. 31, 1935 |

OTHER REFERENCES

Principles of Chemical Eng. Walker, Lewis, McAdams, Gilliland, 1937, pp. 543-4.

Mellor: Comprehensive Treatise on Inorganic and Theoretical Chemistry (volume 8), pp. 104-5.

Chemical Abstracts (1944), p. 2893 [6].